(12) United States Patent
Dasgupta et al.

(10) Patent No.: US 11,544,753 B2
(45) Date of Patent: Jan. 3, 2023

(54) INDICATING FORECASTS OF INVOICE PAYMENTS

(71) Applicant: Intuit Inc., Mountain View, CA (US)

(72) Inventors: Sambarta Dasgupta, Sunnyvale, CA (US); Colin R. Dillard, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/115,097

(22) Filed: Dec. 8, 2020

(65) Prior Publication Data

US 2022/0180413 A1 Jun. 9, 2022

(51) Int. Cl.
*G06Q 30/04* (2012.01)
*G06F 16/22* (2019.01)
*G06K 9/62* (2022.01)

(52) U.S. Cl.
CPC ......... *G06Q 30/04* (2013.01); *G06F 16/2246* (2019.01); *G06K 9/6267* (2013.01)

(58) Field of Classification Search
CPC ... G06Q 30/04; G06F 16/2246; G06K 9/6267
See application file for complete search history.

(56) References Cited

U.S. PATENT DOCUMENTS

| | | | | |
|---|---|---|---|---|
| 10,601,740 | B1* | 3/2020 | Harding | H04L 51/04 |
| 10,713,063 | B1* | 7/2020 | Wilczek | G06F 9/44505 |
| 2018/0040064 | A1* | 2/2018 | Grigg | H04L 41/147 |
| 2020/0097955 | A1* | 3/2020 | Gandhi | G06Q 30/06 |
| 2020/0265326 | A1* | 8/2020 | Shah | G06N 20/00 |
| 2020/0311487 | A1* | 10/2020 | He | G06N 7/005 |

FOREIGN PATENT DOCUMENTS

WO WO-2016131083 A1 * 8/2016

OTHER PUBLICATIONS

Koenker, "Quantile Regression 40 Years On," The Institute of Fiscal Studies, Department of Economics, UCL, Cemmap Working Paper CWP36/17, pp. 1-27, 2017.
Vrushank et al., "Cash Management and Forecasting at Scale," pp. 1-6, 2018.
Zeng et al., (Aug. 2008), "Using predictive analysis to improve invoice-to-cash collection," In Proceedings of the 14th ACM SIGKDD international conference on Knowledge discovery and data mining (pp. 1043-1050).

* cited by examiner

*Primary Examiner* — Scott C Anderson
(74) *Attorney, Agent, or Firm* — Paradice and Li LLP (57) ABSTRACT

This disclosure relates to forecasting when and whether an invoice is to be paid and indicating such forecasts to a user. An example system is configured to perform operations including determining, by a classification model, a first confidence as to whether an invoice is to be paid, determining, by a regression model associated with the classification model, a first time associated with a second confidence as to when the invoice is likely to be paid, and indicating, to a user, whether the invoice is to be paid based on the first confidence and the first time when the invoice is likely to be paid based on the second confidence. The regression model may include one or more gradient boosted trees to determine the first time. Different times associated with different confidences can be determined by different gradient boosted trees, with the specific tree corresponding to the associated confidence.

20 Claims, 5 Drawing Sheets

INDICATING FORECASTS OF INVOICE PAYMENTS

TECHNICAL FIELD

This disclosure relates generally to forecasting systems to indicate predictions, such as indicating forecasts of invoice payments.

DESCRIPTION OF RELATED ART

Businesses track cash flow and revenue to ensure sufficient liquidity for continuing operations. In tracking cash flow, invoice payments and invoices to be paid are reviewed, as outstanding invoices may indicate future cash flow. If invoices are paid consistently and regularly, a user can have an idea of the business' future cash flow based on the outstanding invoices. However, many invoices are paid at different times, if paid at all, which causes predictions of cash flow to be difficult or impossible.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable features disclosed herein.

One innovative aspect of the subject matter described in this disclosure can be implemented as a method for indicating a forecast for an invoice payment to a user. An example method includes determining, by a classification model, a first confidence as to whether an invoice is to be paid. The method also includes determining, by a regression model associated with the classification model, a first time associated with a second confidence as to when the invoice is likely to be paid. The method further includes indicating, to a user, whether the invoice is to be paid based on the first confidence and the first time when the invoice is likely to be paid based on the second confidence.

Another innovative aspect of the subject matter described in this disclosure can be implemented in a system for indicating a forecast for an invoice payment to a user. In some implementations, the system includes one or more processors and a memory coupled to the one or more processors. The memory can store instructions that, when executed by the one or more processors, cause the system to perform operations including determining, by a classification model, a first confidence as to whether an invoice is to be paid. The operations also include determining, by a regression model associated with the classification model, a first time associated with a second confidence as to when the invoice is likely to be paid. The operations further include indicating, to a user, whether the invoice is to be paid based on the first confidence and the first time when the invoice is likely to be paid based on the second confidence.

Another innovative aspect of the subject matter described in this disclosure can be implemented in another system for indicating a forecast for an invoice payment to a user. The system includes one or more processors and a memory coupled to the one or more processors. The memory can store instructions that, when executed by the one or more processors, cause the system to perform operations including obtaining an indication from a user of a desired confidence for a time to be selected as to when an invoice is likely to be paid. The operations also include determining, by a classification model, a first confidence as to whether an invoice is to be paid. The operations further include determining, by a regression model associated with the classification model, a first time as to when the invoice is likely to be paid based on the desired confidence. The operations also include indicating, to the user, whether the invoice is to be paid based on the first confidence and the first time when the invoice is likely to be paid.

Another innovative aspect of the subject matter described in this disclosure can be implemented in a non-transitory, computer readable medium storing instructions that, when executed by one or more processors of a system, cause the system to perform operations including determining, by a classification model, a first confidence as to whether an invoice is to be paid. The operations also include determining, by a regression model associated with the classification model, a first time associated with a second confidence as to when the invoice is likely to be paid. The operations further include indicating, to a user, whether the invoice is to be paid based on the first confidence and the first time when the invoice is likely to be paid based on the second confidence.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

The following description is directed to certain implementations for determining and indicating, to a user, a forecast of whether and when an invoice is to be paid. The predictions are with reference to payment of a business invoice. However, a person having ordinary skill in the art will readily recognize that the teachings herein can be applied in a multitude of different ways or to a multitude of different scenarios. It may be readily understood that certain aspects of the disclosed systems and methods can be arranged and combined in a wide variety of different configurations, all of which are contemplated herein.

Companies attempt to predict future cash flow to ensure the company has sufficient liquidity and will be able to operate without issues in the future. In particular, small businesses (SMBs) may be reliant on invoices being paid in a timely and consistent manner. For example, small businesses may be more reliant on a steady stream of incoming payments because of less reserves or ability to raise money for short term operations as compared to larger businesses. If a forecast only predicts whether an invoice is to be paid, the time when the invoice is eventually paid is unknown and may impact cash flow of a SMB.

As such, there is a need for forecasting cash flow for an SMB to include a prediction as to whether an invoice is to be paid and a prediction as to when the invoice is to be paid.

In some implementations, a system can use one or more prediction models to forecast whether an invoice is to be paid and when an invoice is to be paid. The system then indicates the forecast to a user. The forecast may also be used to implement further actions, such as sending reminders, to expedite payment of the invoice. The system may use a first trained prediction model (such as a machine learning model or other suitable model) to predict whether the invoice is to be paid, and the system may use a second trained prediction model to predict when the invoice is likely to be paid. A prediction of when the invoice is likely to be paid may be determined based on a desired confidence, and when the invoice is likely to be paid may be at any level of granularity (such as to a calendar day). In this manner, the system causes the predictions indicated to the user to be of more relevance, fidelity, and with a desired confidence.

Various aspects of the present disclosure provide a unique computing solution to a unique computing problem that did not exist. More specifically, the problem of filtering computer generated predictions did not exist prior to the use of computer implemented models for prediction based on vast numbers of financial or other electronic commerce-related transaction records, and is therefore a problem rooted in and created by technological advances in businesses to accurately predict future cash flow using one or more machine learning models.

As the number of transactions, business features measured, and records increases to be used for training prediction models, the increased precision of efficiently forecasting invoice payment by machine learning models requires the computational power of modern processors and machine learning models to accurately identify such predictions, in real-time, so that appropriate action can be taken. Therefore, implementations of the subject matter disclosed herein are not an abstract idea such as organizing human activity or a mental process that can be performed in the human mind, for example, because it is not practical, if even possible, for a human mind to evaluate business metrics in the thousands or more at the same time to satisfactorily predict whether and when an invoice is to be paid.

In the following description, numerous specific details are set forth such as examples of specific components, circuits, and processes to provide a thorough understanding of the present disclosure. The term "coupled" as used herein means connected directly to or connected through one or more intervening components or circuits. The terms "processing system" and "processing device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

In the figures, a single block may be described as performing a function or functions. However, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example systems and devices may include components other than those shown, including well-known components such as a processor, memory, and the like.

Several aspects of forecasting (also referred to as predicting) invoice payments and indicating a forecast to a user for a business will now be presented with reference to various apparatus and methods. These apparatus and methods will be described in the following detailed description and illustrated in the accompanying drawings by various blocks, components, circuits, devices, processes, algorithms, and the like (collectively referred to herein as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
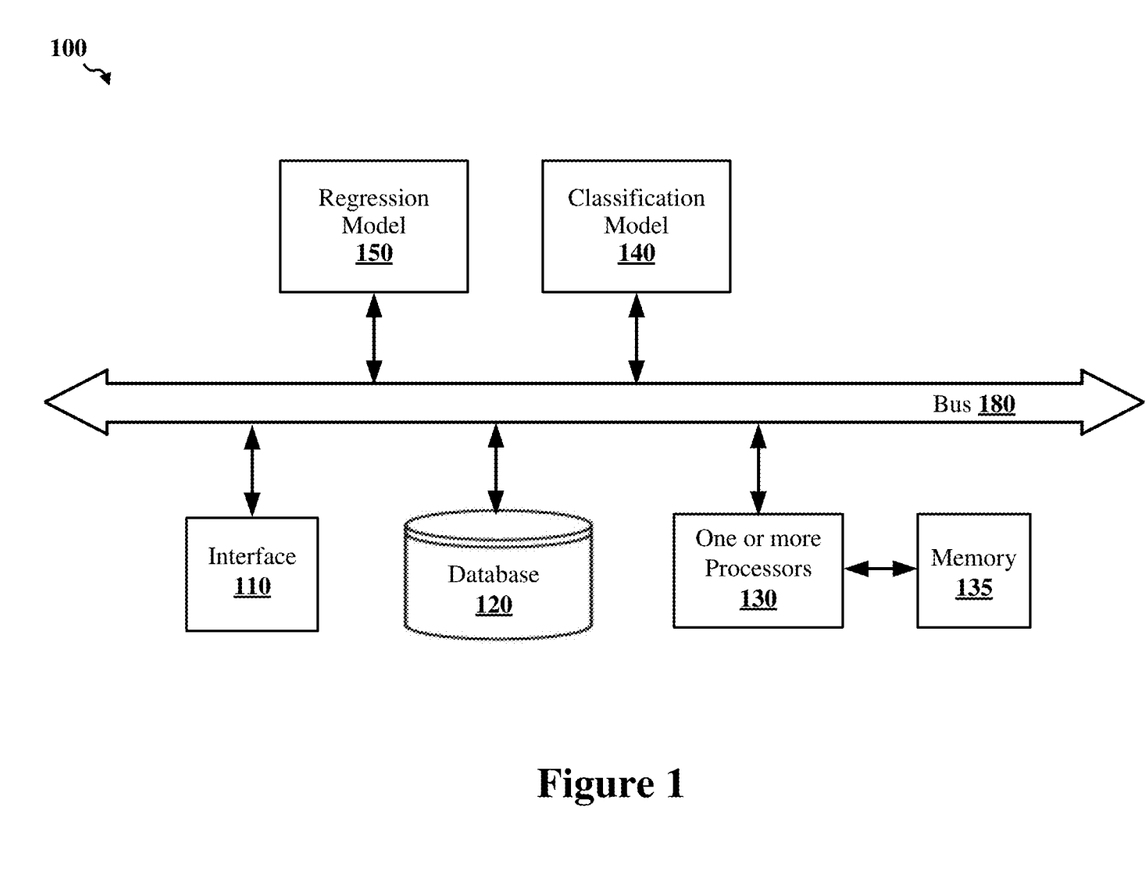
FIG. 1 shows a block diagram of a system to forecast whether and when an invoice is to be paid and indicating the forecast to a user, according to some implementations.

FIG. 1 shows a block diagram of a system 100 to forecast whether and when an invoice is to be paid and indicating the forecast to a user, according to some implementations. Although described herein as a forecast with respect to invoice payment for a business (such as an SMB), in some other implementations, the predictions may be with respect to other scenarios, such as asset sales, supply and demand analysis, and so on. The system 100 is shown to include an input/output (I/O) interface 110, a database 120, one or more processors 130, a memory 135 coupled to the one or more processors 130, a classification model 140, a regression model 150, and a data bus 180. The various components of the system 100 may be connected to one another by the data bus 180, as depicted in the example of FIG. 1. In other implementations, the various components of the system 100 may be connected to one another using other suitable signal routing resources.

The interface 110 may include any suitable devices or components to obtain information (such as input data) to the system 100 and/or to provide information (such as output data) from the system 100. In some instances, the interface 110 includes at least a display and an input device (such as a mouse and keyboard) that allows users to interface with the system 100 in a convenient manner. The interface 110 may indicate one or more predictions determined by one or more of the models 140 and 150. Example indications may include a visual indication of a prediction as to whether an invoice is to be paid (such as a confidence (also referred to as a probability) that the invoice is to be paid or a binary indication as to whether the invoice is to be paid) and a prediction as to when an invoice is to be paid (such as a predicted calendar day with reference to an invoice due date based on a desired confidence that the invoice is paid by the day). In one example, the prediction is indicated to a user via a display. As used herein, a confidence may refer to a confidence score, grade, or any other suitable measurement of a confidence or likelihood that an event will occur. For example, a confidence that an invoice is to be paid may refer to a confidence score or other suitable measurement indicating the likelihood that the invoice is to be paid at some point in the future. Other example interfaces 110 may be configured to perform other actions, such as an email client to email a payor, a text client to send a text message to a payor, or a module to cause a paper reminder to be generated for mailing to the payor.

The input data includes data provided to the prediction models 140 and 150 to generate predictions. The input data may include training data to train the models 140 and 150 or operational data provided to the trained models to determine predictions to be indicated to a user. As noted above, while the examples herein are described with reference to forecasting when and whether invoices are to be paid, the system 100 may be configured to predict any suitable metric of interest to a user.

The input data is associated with a plurality of features measured for invoices. Example features are with reference to invoices, payors, and the company, and may be any suitable metric that may impact predicting whether and when an invoice is to be paid. Example features may include (but are not limited to) one or more of the following:

Invoice amount (such as the amount in dollars owed). Larger invoices may impact when an invoice is paid by certain payors.

Creation date of invoice. Time from when an invoice is created may impact when an invoice is paid.

Due date of invoice (the day payment is due). A probability that an invoice is paid may increase as the due date approaches.

First day an invoice sent to payor. Time from when an invoice is first sent may impact when an invoice is paid.

Last day an invoice sent to payor. Time from when an invoice is last sent may impact whether and when an invoice is paid. For example, if multiple reminders are sent, the probability an invoice is paid may decrease as time passes since the last reminder was sent.

Average of past delinquency in payments by payor (such as average number of days past the due date an invoice is paid). The larger mean number of days past a due date causes a prediction as to when an invoice is to be paid to be a later date.

Standard deviation of past delinquency in payments by payor. A larger standard deviation causes a larger uncertainty in determining when and whether an invoice is to be paid.

Number of previous past delinquencies by payor. A larger number of delinquencies increases the likelihood that a present invoice will also be delinquent.

Maximum number of days of past delinquency by payor. A different number can cause a different confidence in a prediction as to when an invoice is to be paid.

Minimum number of days of past delinquency by payor. A different number can cause a different confidence in a prediction as to when an invoice is to be paid.

Whether an invoice was viewed by the payor (such as an email read receipt or other indication that the payor has seen the invoice). A payor not viewing an invoice may decrease the likelihood an invoice is paid and affect when an invoice is paid.

Whether an invoice was sent to the payor. Whether a payor has received an invoice may affect the likelihood an invoice is paid and affect when an invoice is paid.

Whether the payor is still an active merchant (such as indicating whether the payor is still active in ordering from the company). A payor no longer being active may decrease the likelihood an invoice is paid.

Whether the invoice is enabled for specific forms of payment (such as electronic payment, internal control number (ICN) based payment, and so on). Invoices that are enabled for ICN payment may impact when and whether the invoice is paid.

Whether the invoice was created by the user or imported from a preexisting data set. For example, if a company takes over a debt for a payor from another company, the previous invoices may have a less reliable impact on determining whether and when the invoice is to be paid.

The training data and the operational data are described with invoices to the specific company that issues the invoices. In this manner, sensitive payor information is not shared between companies. However, if desired by the payors and companies and if legally permissible, date from other companies can be used for training the models 140 and 150 to increase their accuracy. For example, multiple companies may have invoice records for the same payor, and those records may be collected and used for training.

Example training data is described in more detail below with reference to FIG. 3, and example operational data is described in more detail below with reference to FIG. 4.

The database 120 can store any suitable information relating to the input data or the predictions. For example, the database 120 can store training data or operational data received via the interface 110, previous predictions, variable information or other information about the models 140-160, or other suitable information. In some instances, the database 120 can be a relational database capable of manipulating any number of various data sets using relational operators, and present one or more data sets and/or manipulations of the data sets to a user in tabular form. The database 120 can also use Structured Query Language (SQL) for querying and maintaining the database, and/or can store information relevant to the predictions in tabular form, either collectively in a table or individually for each prediction. In some implementations, the training data may be included in an index (such as depicted in FIG. 3), and the operational data may be included in another index including the predictions (such as depicted in FIG. 4).

The one or more processors 130, which may be used for general data processing operations (such as transforming data stored in the database 120 into usable information), may be one or more suitable processors capable of executing scripts or instructions of one or more software programs stored in the system 100 (such as within the memory 135). The one or more processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the one or more processors 130 may be implemented as a combination of computing devices (such as a combination of a DSP and a microprocessor, a plurality of microprocessors, one or more microprocessors in conjunction with a DSP core, or any other such configuration).

The memory 135 may be any suitable persistent memory (such as one or more nonvolatile memory elements, such as EPROM, EEPROM, Flash memory, a hard drive, etc.) that can store any number of software programs, executable instructions, machine code, algorithms, and the like that, when executed by the one or more processors 130, causes the system 100 to perform at least some of the operations described below with reference to one or more of the Figures. In some instances, the memory 135 can also store the training data and the operational data for the models 140 and 150. The memory may also include instructions to implement the models 140 and 150, including training of the models (such as a learning rate and other operators determined for machine learning models to predict when and whether an invoice is to be paid) and operation of the models based on the training and operational data.

The classification model 140 can be used to generate a prediction from the operational data obtained by the system 100. In some implementations, the classification model 140 is a binary classification model configured to solve a binary classification problem of whether an invoice is to be paid or not be paid. For example, the classification model 140 predicts a first confidence as to whether an invoice is to be paid, and the system 100 may indicate whether the invoice is to be paid. The classification model 140 may be any suitable prediction model associated with a loss function (to ensure that training of the model 140 does not cause the trained model to overfit the historical data, which may increase inaccuracies in future predictions). For example, the classification model may be a machine learning model based on one or more of decision trees, random forests, logistic regression, nearest neighbors, classification trees, control flow graphs, support vector machines, naïve Bayes, Bayesian Networks, value sets, hidden Markov models, or neural networks configured to predict one or more data points from the input data.

In some implementations, the classification model includes a gradient boosted tree to determine the prediction as to whether an invoice is to be paid. The gradient boosted tree may be trained based on a learning rate to reduce a loss of the loss function. For example, the training data may be applied to the gradient boosted tree to generate an output, the tree may be adjusted based on the learning rate and the output, the loss is determined for the adjusted tree, and the training data may be applied to the adjusted tree. The process is repeated until the loss does not decrease by a threshold amount over a consecutive number of epochs. For example, the Adam algorithm (or another suitable algorithm) may be used in training the model 140 using the training data. In some implementations, the loss function is a receiver operating characteristic (ROC) loss function, and the ROC loss is reduced in training the model 140. In this manner, the confidence determined by the classification model 140 is based on the ROC loss function. For example, the predicted confidence is associated with a minimum of the ROC loss from the ROC loss function determined from the gradient boosted tree using the operational data for the invoice. In some implementations, the confidence may be compared to a threshold for the binary decision of whether an invoice is to be paid, and the binary decision may be indicated to a user.

The regression model 150 can also be used to generate a prediction from the operational data obtained by the system 100. In some implementations, the regression model 150 predicts a time as to when an invoice is to be paid, and the system 100 may indicate the predicted time when an invoice is to be paid. For example, based on a confidence of when an invoice is to be paid (such as a 50 percent likelihood or a different desired likelihood that an invoice is paid by a specific time), the model 150 predicts the time by which the invoice has a 50 percent likelihood in being paid. As used herein, a time may be any suitable measurement. In some implementations, a predicted time is a day with reference to the due date of the invoice. For example, the predicted time may be a determined number of days before or after the due date (such as −3 days, 0 days, 4 days, and so on). In some other implementations, the predicted time is a calendar day. For example, the predicted time may be in an output of YYYY-MM-DD or any other suitable format indicating a calendar day. However, any suitable unit of time may be used, such as hours, groups of days, weeks, and so on, with reference to a calendar, the due date, the creation date, or any other suitable reference.

The regression model 150 may be any prediction model associated with a loss function (to ensure that training of the model 150 does not cause the trained model to overfit the historical data, which may increase inaccuracies in future predictions). For example, the regression model may be a machine learning model based on one or more of decision trees, random forests, logistic regression, nearest neighbors, classification trees, control flow graphs, support vector machines, naïve Bayes, Bayesian Networks, value sets, hidden Markov models, or neural networks configured to predict one or more data points from the input data.

In some implementations, the regression model includes one or more gradient boosted trees to predict one or more times based on one or more confidences of when an invoice is to be paid. For example, the regression model 150 includes a plurality of gradient boosted trees. Each gradient boosted tree may be trained using the training data to be associated with a different confidence of when an invoice is to be paid. In some implementations, the regression model 150 is a quantile based regression model, and training the model is based on quantile regression of the training data. Quantile regression may be used to prevent requiring making any assumptions as to the specific nature of the probability distribution for the predictions. For example, the distribution is not required to be a specific parametric distribution (such as being asymmetric or multi-model based not associated with a single parametric distribution).

Each gradient boosted tree may be associated with a different quantile. For example, if 10 quantiles are used for the regression model (such as 0-10 percent being a first quantile, 10-20 percent being a second quantile, and so on), the regression model 150 includes 10 gradient boosted trees. Each gradient boosted tree may be trained based on the associated quantile, a learning rate, and the training data similar to as described above with reference to the classification model 140. Since each gradient boosted tree is associated with a different quantile, the gradient boosted trees may differ from one another as a result of the training.

In this manner, the regression model 150 may be configured to predict a plurality of times associated with a plurality of confidences of when the invoice is likely to be paid. For example, a first time may be determined using a first gradient boosted tree associated with a first quantile, a second time may be determined using a second gradient boosted tree associated with a second quantile, and so on. The predicted time to be indicated to the user may be based on a desired confidence for the predicted time. For example, if the user desires the confidence in the time to be greater than 40 percent, the system 100 may be configured to select the time determined by the gradient boosted tree associated with the fifth quantile to be indicated to the user. In some implementations, determining the time to be indicated to the user may refer to selecting one of the gradient boosted trees based on the desired confidence. In this manner, the selected gradient boosted tree is used to predict a time to be indicated to the user (without requiring the other gradient boosted trees to predict a time associated with the corresponding confidences).

As noted above, training of a gradient boosted tree may be based on a learning rate to reduce a loss of the loss function. For example, the training data may be applied to the gradient boosted tree to generate an output, the tree may be adjusted based on the learning rate and the output, the loss is determined for the adjusted tree, and the training data may be applied to the adjusted tree. The process is repeated until the loss does not decrease by a threshold amount over a consecutive number of epochs. For example, the Adam algorithm (or another suitable algorithm) may be used in training each gradient boosted tree of the model 150 using the training data. In some implementations, the loss function measures a mean square error (MSE) for the predicted time, and the MSE is reduced in training the model 150. If the model 150 includes multiple gradient boosted trees, each gradient boosted tree's loss function is optimized to reduce the MSE. In this manner, each time predicted by the regression model 150 using a different gradient boosted tree is based on a different loss function. For example, the predicted time is associated with a minimum of the MSE from the loss function determined from the corresponding gradient boosted tree for the desired confidence using the operational data for the invoice. While the examples herein describe a regression model 150 including multiple gradient boosted trees (associated with different loss functions), in some other implementations, the model 150 may include a single gradient boosted tree. For example, a single loss function may be associated with the entirety of confidences (such as if the predictions follow a parametric distribution), and the gradient boosted tree may be used to predict a time based on a desired confidence and the loss function associated with the gradient boosted tree.

If 5 percent quantiles are used for predicting the times when an invoice is to be paid based on the quantile and the predicted times are of calendar days, the output of some times by the regression model 150 may be as below (with specific calendar days and quantiles shown as an example):
{"quantiles":{
"20": "2020-05-21",
"30": "2020-05-27",
"35": "2020-05-29",
"50": "2020-06-06",
"65": "2020-06-08",
"70": "2020-06-09",
"80": "2020-06-13" }}

As shown, as the quantiles increase (corresponding to an increase in confidence), the predicted calendar day becomes later in time. Also as shown, any number of quantiles and intervals of quantiles may be used in generating the output of the model 150. In this manner, a portion or all of the gradient boosted trees may be used in predicting times associated with different confidences of when an invoice is to be paid.

In some implementations, a user may indicate a desired confidence for the predicted time. In this manner, the system 100 may compare the desired confidence to the plurality of confidences (such as the confidences in the output), and the system 100 may select the time to be indicated to the user based on the comparison. For example, if the desired confidence is 80 percent for the above example output, the time "2020-06-13" may be indicated to the user as the predicted time when the invoice is likely to be paid.

Predictions by the models 140 and 150 may be included in one or more indexes stored in the database 120 or a memory (such as memory 135). As time passes, the classification model 140 may periodically redetermine a confidence as to whether an invoice is to be paid, and the regression model 150 may periodically redetermine a time as to when the invoice is likely to be paid (based on a desired confidence). The new confidence and time may be indicated to the user to apprise the user of any changes in the predictions. For example, as each day passes, one or more of the features may change (such as days before or after the due date, days since the invoice was first sent or last sent, and so on). Also, when an invoice is paid, such information may be included in the data. In some implementations, another feature is a comparison of the actual payment date (and whether the invoice was paid) compared to the predictions generated by the models 140 and 150. In this manner, information about previous predictions may be used as a feedback for the models 140 and 150. The features may be updated each day (or another suitable time interval), and the models 140 and 150 may determine new predictions each day based on the updated features.

In some implementations, the models 140 and 150 may be periodically retrained. For example, every two to three months (or another suitable interval of time), training data including new invoice data generated during the previous time interval is used to train the gradient boosted trees. In this manner, the gradient boosted trees do not become stale with reference to changes in more recent invoice data.

Each of the classification model 140 and the regression model 150 may be incorporated in software (such as software stored in memory 135) and executed by one or more processors (such as the one or more processors 130), may be incorporated in hardware (such as one or more application specific integrated circuits (ASICs), or may be incorporated in a combination of hardware or software. For example, one or more of the models 140 or 150 may be coded using Python for execution by the one or more processors. In addition or to the alternative, the components 140 and 150 may be combined into a single component or may be split into additional components not shown. The particular architecture of the system 100 shown in FIG. 1 is but one example of a variety of different architectures within which aspects of the present disclosure may be implemented.

The system 100 is configured to determine predictions from the models 140 and 150 and indicate the predictions to a user. With the system 100 configured to indicate times and confidences with a desired level of granularity (such as a predicted day), a user may have a higher confidence in the predictions with reference to a company's future cash flow. In addition, the predictions may be used by the system 100 to send reminders to a payor or otherwise perform actions to increase the likelihood whether or decrease the time when an invoice is to be paid.

Figure 2:
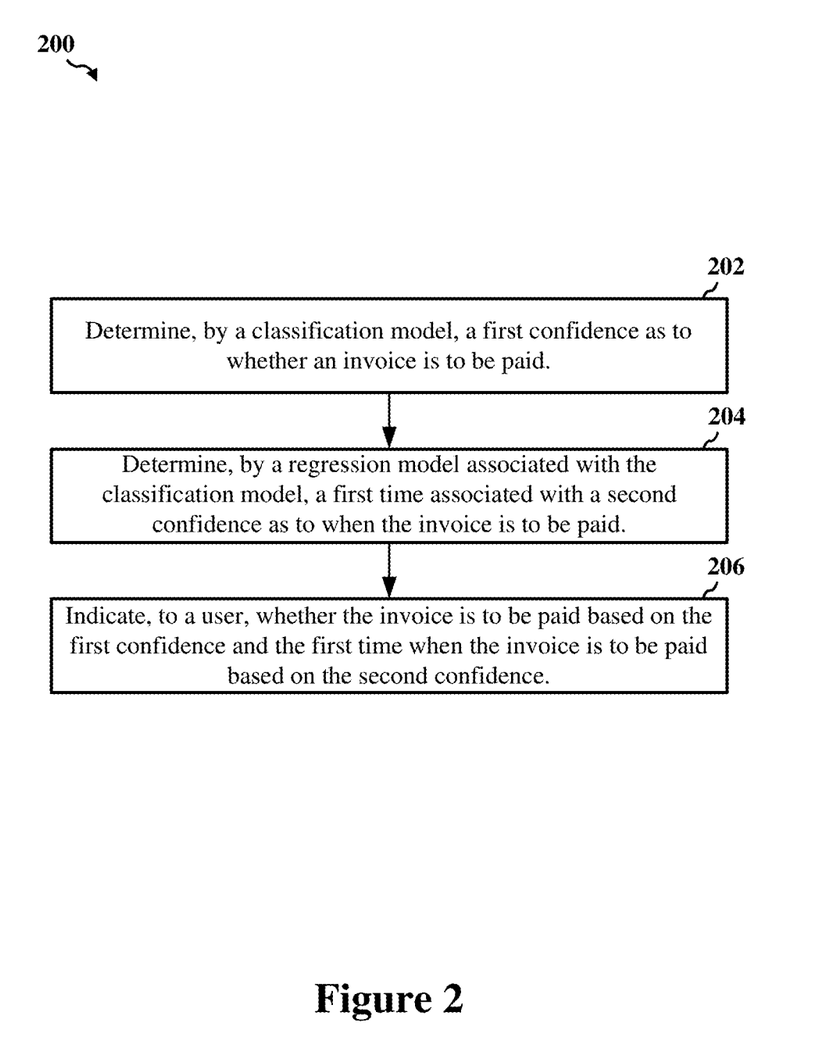
FIG. 2 shows an illustrative flowchart depicting an example operation for indicating whether an invoice is to be paid and a time when the invoice is likely to be paid, according to some implementations.

FIG. 2 shows an illustrative flowchart depicting an example operation 200 for indicating whether an invoice is to be paid and a time when the invoice is likely to be paid, according to some implementations. The example operation 200 is described as being performed by the system 100 (such as by the one or more processors 130 executing instructions to perform operations associated with the components 140 and 150). At 202, the system 100 determines, by the classification model 140, a first confidence as to whether an invoice is to be paid. For example, operational data regarding an invoice is provided to a gradient boosted tree trained for the classification model 140, and the gradient boosted tree determines a confidence as to whether an invoice is to be paid based on a minimum ROC loss of the ROC loss function determined for the operational data.

At 204, the system 100 determines, by the regression model 150 associated with the classification model 140, a first time associated with a second confidence as to when the invoice is likely to be paid. The regression model 150 may be associated with the classification model 140 based on the same training data being used to train the models 140 and 150. In some implementations, the regression model 150 determining a first time as to when the invoice is likely to be paid may include determining a plurality of times associated with a plurality of confidences of when the invoice is to be paid. The plurality of times includes the first time and the plurality of confidences includes the second confidence. For different confidences, a different gradient boosted tree of the regression model 150 may be used to determine a different time. For example, operational data regarding an invoice is provided to one or more gradient boosted trees trained for the regression model 150, and each gradient boosted tree determines a time associated with a confidence corresponding to the particular gradient boosted tree as to when an invoice is to be paid. The time is based on a minimum MSE of the loss function determined for the operational data by the particular gradient boosted tree. In some implementations, each gradient boosted tree is associated with a unique quantile, and the time determined by the gradient boosted tree is associated with the corresponding quantile.

If multiple times are determined for different confidences (such as for different quantiles), the system 100 may obtain an indication from the user of a desired confidence for a predicted time when the invoice is to be paid. The system 100 may compare the desired confidence to the plurality of confidences for the plurality of predicted times, and the system 100 may select the first time from the plurality of times based on the comparison (such as the first time being determined by a gradient boosted tree associated with a second quantile and the desired confidence being in the second quantile).

At 206, the system 100 indicates, to a user, whether the invoice is to be paid based on the first confidence and the first time when the invoice is likely to be paid based on the second confidence. The indication is via the one or more interfaces 110 (such as via a monitor). In some implementations, indicating whether the invoice is to be paid includes indicating a binary decision output as to whether the invoice is to be paid. For example, the first confidence is compared to a threshold (such as a 50 percent likelihood that the invoice is to be paid). If the first confidence is less than the threshold, the system 100 indicates that the invoice is likely not to be paid. If the first confidence is greater than the threshold, the system 100 indicates that the invoice is likely to be paid. Any number of thresholds may be used for the decision (such as to indicate varying levels of likelihood that the invoice is to be paid). In addition or to the alternative, the one or more thresholds may be adjustable as desired for the decision. The system 100 may indicate the first confidence along with the binary decision or one of the variables to the user as desired in indicating whether the invoice is to be paid.

Indicating the first time to the user may include indicating the time via a display or other suitable interface 110. In some implementations, the system 100 may indicate multiple times associated with different confidences. For example, the output from the model 150 for different quantiles (such as described above) may be formatted and indicated to a user so that a user is apprised of different times associated with different confidences.

While not shown in FIG. 2, the system 100 may also send a reminder to a payor based on the predictions. For example, if the first confidence is below a threshold or if the first time is after the due date, the system 100 may send an email or other electronic reminder to the payor.

FIG. 2 illustrates blocks 202 and 204 occurring in sequence exclusively for the sake of not obfuscating aspects of the disclosure. In some other implementations, blocks 202 and 204 may be performed concurrently or in a different order. For example, the classification model and the regression model may be models independent of each other and based on a user's needs. In this manner, the models may perform the operations of determining a first confidence and determining a first time at any desired moment or in any desired order. In another example, the models may be combined such that blocks 202 and 204 are a single block for determining the first confidence and the first time.

As noted above, training data is used to train the models 140 and 150. The training data includes information regarding any suitable features regarding the company, payor, and invoice. The training data also includes target variables indicating when and whether an invoice was paid (which may be with reference to a due date of the invoice). In some implementations, the features also include a comparison of the target variables and previous predictions by the models 140 and 150 so that previous predictions may be used as a feedback in training the models 140 and 150.

Figure 3:
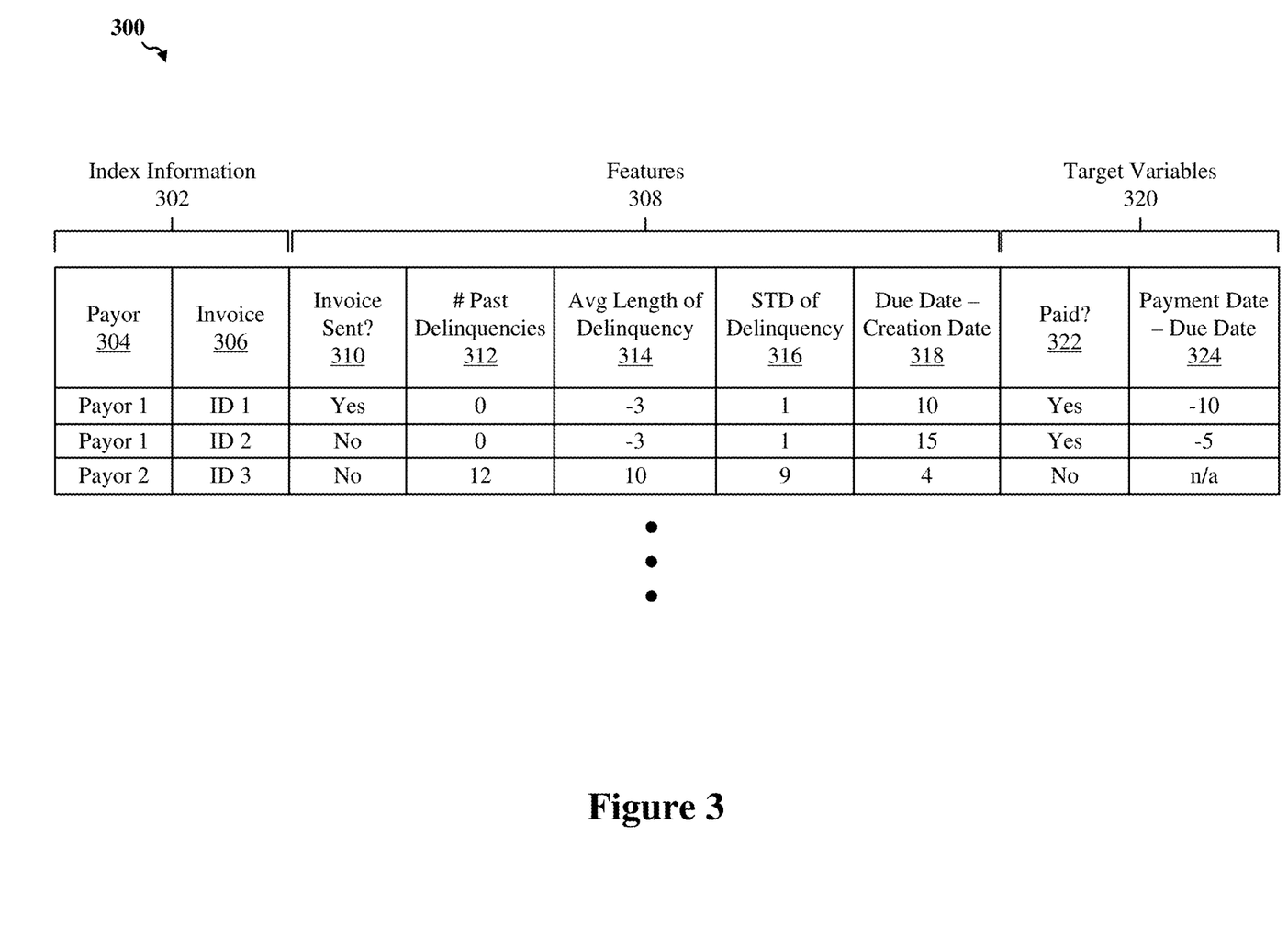
FIG. 3 shows a depiction of example training data to train a classification model and a regression model to predict whether and when an invoice is to be paid.

FIG. 3 shows a depiction of example training data 300 to train a classification model 140 and a regression model 150 to predict whether and when an invoice is to be paid. In some implementations, the training data 300 includes index information 302. For example, the index information includes an indication of a payor 304 for an invoice and an indication of the invoice 306. In this manner, the training data may be in an index that can be sorted and otherwise processed based on invoice or payor. In the example training data 300, each line is associated with a different invoice. For example, as shown, the three invoices have different IDs for invoice 306 (ID 1, ID 2, and ID 3). In the example, invoice ID 1 and invoice ID 2 are associated with the same payor 304 (payor 1). Invoice ID 3 is associated with different payor 2.

The features 308 are provided to the models 140 and 150 during training and the output from the models 140 and 150 during training are compared to the target variables 320 over several epochs to reduce the differences between the output from the models 140 and 150 and the target variables 320. For example, each gradient tree may be trained based on outputs from the gradient tree and the associated target variables 320 for the gradient tree (with the "paid?" indication 322 corresponding to training the classification model 140 and the "payment date—due date" indication 324 corresponding to training the regression model 150). Training of a gradient tree may end when an overall loss associated with the tree is not reduced by a threshold amount over a consecutive number of epochs.

The features 308 include measurements corresponding to the specific invoice or company or payor of the invoice that may impact the predictions by the models 140 and 150. The example training data 300 indicates some features 308 as an example, but any suitable features (such as any features noted above or which may otherwise impact predictions by the models 140 and 150) may be included in the training data 300. As shown, the features 308 include:

- an indication 310 as to whether an invoice was sent to the payor. Invoice ID 1 was sent to payor 1. Invoices ID 2 and ID 3 were not sent to payor 1 and payor 2, respectively.
- an indication 312 of the number of past delinquencies. Payor 1 has paid all invoices by their due dates. Payor 2 has paid after the due date (or has not paid) twelve invoices. The indication 312 may be over any defined time period, such as the last year or since the beginning of the records.
- an indication 314 of an average (avg) length of delinquency with reference to the due date. Payor 1, on average, pays invoices three days before the due date (with the negative number indicating before a due date). Payor 2, on average, pays invoices ten days after the due date. The average may be determined just from the delinquent invoices or may be determined from all invoices. Invoices not paid may be excluded or included in the calculation (such as assigning a determined number of days to invoices not paid).
- an indication 316 of the standard deviation (STD) of delinquency. The standard deviation may correspond to the average determined for indication 314. As shown, payor 1 is associated with a lower standard deviation as compared to payor 2, indicating a lower variance in results (such as target variables 320) compared to predictions (in other words, one or more predictions are more likely to be correct when the standard deviation is lower).
- an indication 318 of the number of days between the due date of an invoice and the creation date of the invoice (due date—creation date). As shown, the number of days for payor 1 is at least ten days, while only four days was between the creation date and the due date for invoice ID 3 for payor 2.

The target variables 320 indicate when and whether each invoice was paid. In the example, since the invoice ID 3 was not paid (indication 322 is "No"), indication 324 may not include a number associated with when the invoice was paid. In some other implementations, the indication 324 may be assigned a determined value for when an invoice is not yet paid.

As noted above, the training data 300 may be used to train the plurality of gradient boosted trees for the models 140 and 150. The trained models may then be used to predict whether and when an invoice is to be paid based on operational data (such as described above).

Figure 4:
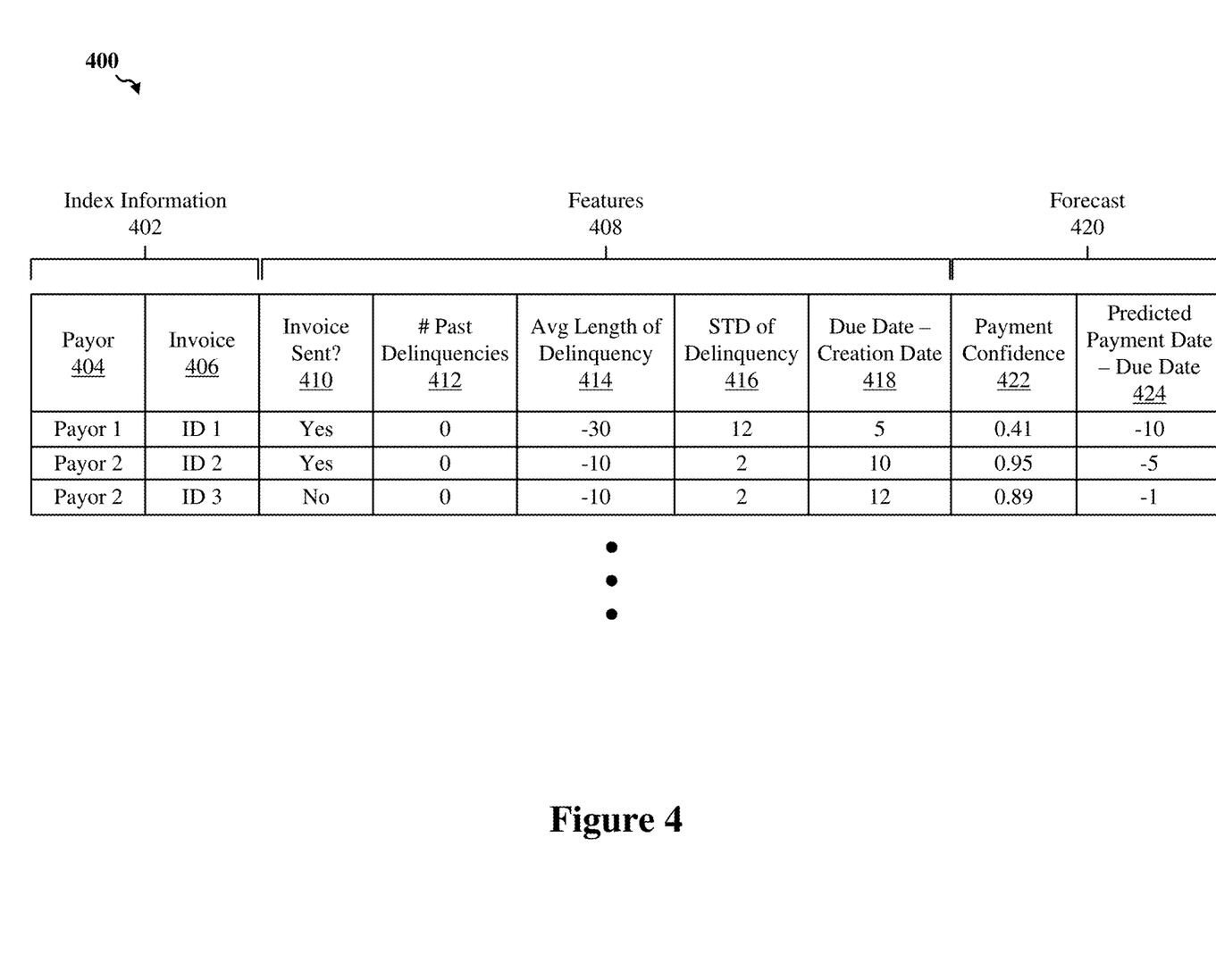
FIG. 4 shows a depiction of example operational data including a forecast for one or more invoices.

FIG. 4 shows a depiction of example operational data 400 including a forecast 420 for one or more invoices. Similar to the training data 300 (FIG. 3), the operational data 400 may include index information 402 and measured features 408 for a plurality of invoices (with each line in the data 400 corresponding to an invoice). The data 400 may also include any forecasts 420 determined by the system 100. While the operational data 400 shows all fields being filled for each invoice, some fields may be blank. For example, one or more features 408 may not yet be measured for an invoice, or the system 100 may not have determined one or more fields for the forecast 420 for an invoice.

In the example data 400, the index information may include indication 404 of the payor and indication 406 of the invoice. In the example, the data 400 includes information for three invoices associated with two payors. The payor IDs may be the same as the payor IDs in the training data 300, but the invoice IDs may be unique. In this manner, the two indexes may be related to one another based on payors or invoices. While the examples in FIGS. 3 and 4 are depicted for a single company, if invoice information from multiple companies may be permitted, the data 300 or 400 may include another indication in the index information as to the company associated with the specific invoice. In this manner, the indexes may be associated with reference to the companies generating the invoices. Similar to the example in FIG. 3, the features 408 may include indications 410-418.

The features 408 are provided to the trained models 140 and 150 to generate the forecast 420. For example, the features 408 for invoice ID 1 to payor 1 may be provided to the classification model 140 to generate an indication 422 of a first confidence of 0.41 indicating a 41 percent likelihood that the invoice is to be paid. The features 408 for invoice ID 1 to payor 1 may also be provided to the regression model 150 to generate an indication 424 of a first time of 10 days before the due date that the invoice is to be paid. In the example, the indication 424 may be associated with a 20 percent confidence indicating a 20 percent likelihood that the invoice is to be paid by 10 days before the due date.

In some implementations, the system 100 may generate a first time with reference to the due date (such as depicted for indication 424). The system 100 may then convert the time to a calendar day. For example, the due date may be a specific calendar day, and the indicated number of days in indication 424 is counted from the specific calendar day of the due date to generate a predicted time as a calendar day.

However, any suitable indication of the predicted time may be used by the system 100 (including a predicted time with reference to the due date, such as in indication 424).

In some implementations, as payments are received for invoice records in the operational data 400, the system 100 may move the invoice records (with the payment information) to the training data 300. In addition, after a set number of days past a due date that an invoice is not paid, the invoice record may be moved from the operational data 400 to the training data 300 as not paid. However, the operational data 400 may be updated in any suitable manner with reference to the received payments. Maintenance of the data 300 and 400 may be performed in any suitable fashion (such as removing invoice records older than a threshold amount of time or moving records between data after a threshold amount of time).

In some implementations, the operational data 400 may be provided by system 100 to other systems or by system 100 for use by one program to another. For example, the predictions may originally be used in a financial management or accounting program. The system 100 may then export the predictions and other information to a tax preparation software to predict future tax implications based on the predicted invoice payments. However, any other suitable use or manipulation of the electronic data may be envisioned.

Figure 5:
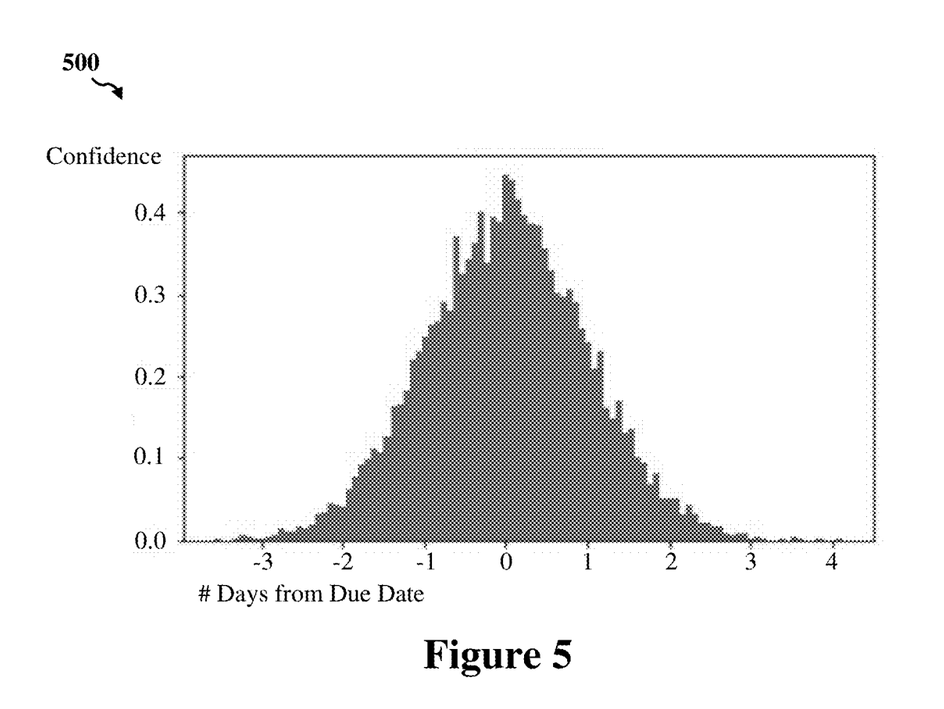
FIG. 5 shows a depiction of an example distribution of confidences for when an invoice is predicted to be paid.
Figure 6:
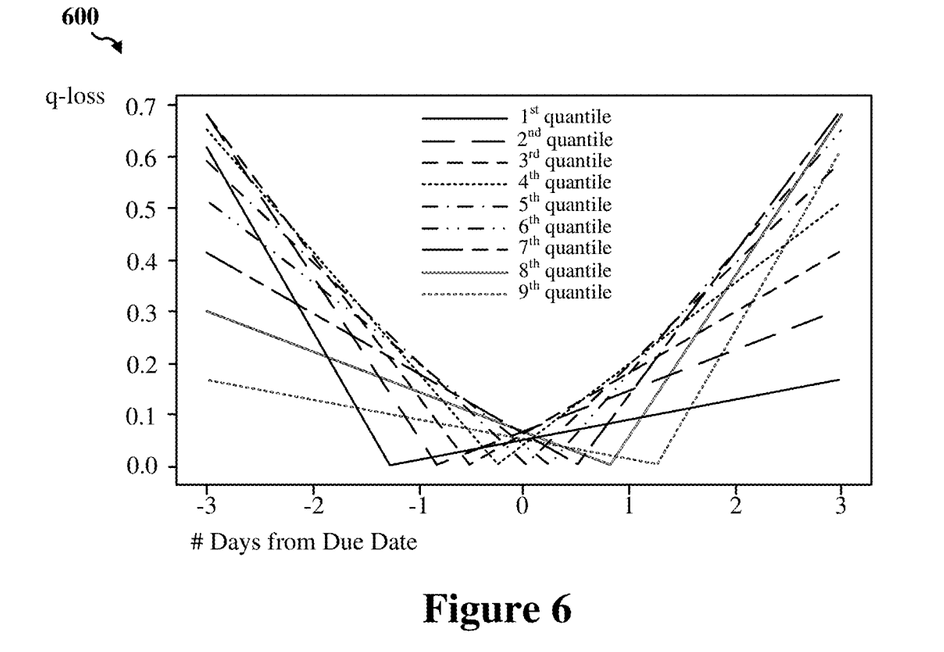
FIG. 6 shows a depiction of a graph of example quantile losses (q-losses) for when an invoice is predicted to be paid.

As noted above, determining whether an invoice is to be paid and determining when an invoice is to be paid is based on a minimum loss in the respective loss functions generated for the operational data for the respective invoice features. For example, a first confidence determined by a gradient boosted tree of the classification model 140 may be based on a minimum ROC loss from the corresponding loss function. The different times determined by different gradient boosted trees (associated with different quantiles) of the regression model 150 may be based on a minimum MSE from the corresponding loss function for each gradient boosted tree. FIGS. 5 and 6 depict examples of a distribution of different predictions by the gradient boosted trees of the regression model 150 and the outputs of the loss functions associated with the gradient boosted trees of the regression model 150 to visualize predicting a first time based on a second confidence.

FIG. 5 shows a depiction of an example distribution 500 of confidences with reference to when an invoice is predicted to be paid. The distribution 500 is illustrated as an approximately Gaussian distribution in the example for simplicity purposes, but the distribution may take any shape. As shown, the likelihood of the invoice being paid on a certain day increases as the day approaches the due date. Each bar in the distribution 500 may represent a specific percentage point of the confidence (such as from 1 to 99 percent). While the predictions are shown at being at an interval of less than a day (with multiple bars being included per day as a result of each bar representing a percentage point), the number of predictions and intervals may be any suitable number and length.

FIG. 6 shows a depiction of a graph 600 of example quantile losses (q-losses) for when an invoice is predicted to be paid. The graph 600 is of the loss functions' g-losses for nine different quantiles at a 10 percent confidence interval. For example, the $1^{st}$ quantile is a 10 percent confidence, the $2^{nd}$ quantile is a 20 percent confidence, and so on. In the example, a q-loss may be the MSE determined using the loss function for the specific gradient boosted tree associated with the quantile. As shown, the q-loss from a loss function reduces up to a time and increases after the time. For example, the q-loss from the $1^{st}$ quantile is charted as having a minimum at between 1 day and 2 days before the invoice due date.

The loss function to determine the q-loss is determined using the associated gradient boosted tree for the confidence provided with the operational data for the invoice. For example, the features 408 for invoice ID 1 in FIG. 4 may be provided to the gradient boosted tree associated with the $1^{st}$ quantile to determine a time associated with a 10 percent confidence. The gradient boosted tree provides the loss function for predicting the time based on the operational data.

Based on the minimum of the loss function for the $1^{st}$ quantile, the predicted time is between 1 day and 2 days before the due date. If the predictions are at a daily level, the time may be predicted to be the day closest to the minimum or the day after the minimum of the function for the quantile. For example, the predicted time for the $1^{st}$ quantile may be 1 day before the due date in both instances. The predicted time for the $2^{nd}$ quantile may be 1 day before the due date (as the closest day to the minimum) or the day of the due date (the day after the minimum). Referring back to the $1^{st}$ quantile, the minimum of the loss function is determined as approximately 1 day before the due date (as illustrated for the $1^{st}$ quantile in graph 600). In this manner, the time associated with the $1^{st}$ quantile (such as a 10 percent confidence) is predicted to be 1 day before the due date. In other words, the system 100 predicts with a 10 percent confidence that the invoice is to be paid by 1 day before the due date.

In the example, since the probability distribution 500 in FIG. 5 is approximately a Gaussian distribution, the spacing of the minimums of the loss functions for the evenly spaced quantiles approximates a Gaussian distribution. However, since the distribution in FIG. 5 may be any suitable distribution, the graphs of the loss functions and the spacings between the graphs (including the spacings between the minimums) may vary.

In some implementations, as a result of predicting multiple times associated with different confidences, the system 100 may generate confidence bounds for the times. For example, the system 100 may determine a confidence bound from 20 percent confidence to 80 percent confidence of a range of times predicted for when the invoice is to be paid. For example, referring back to the above example output of multiple times and confidences from the regression model 150, a confidence bound of 20 percent to 80 percent corresponds to a time range of "2020-05-21" to "2020-06-13." The confidence bound may be adjustable as desired, which may adjust the time range. In this manner of adjusting the confidence corresponding to the predicted time, a user has control tailoring the output of the system 100 as to when an invoice is predicted to be paid for his or her particular needs. For example, a more conservative user may increase the desired confidence, and a more aggressive user may decrease the desired confidence associated with a predicted time of when the invoice is to be paid in order to tailor the output of the system 100 to his or her needs.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of indicating a forecast for an invoice payment to a user, comprising:
    providing features of an operational data for an invoice to a classification model and to a regression model, wherein:
        the classification model is a first machine learning model trained to solve a binary classification problem of whether the invoice is to be paid;
        the first machine learning model is associated with a first loss function and is trained based on the first loss function using a training data associated with one or more previous invoices;
        the regression model is a second machine learning model trained to predict a time as to when the invoice is likely to be paid based on a desired confidence; and
        the second machine learning model is associated with one or more loss functions separate from the first loss function and is trained based on the one or more loss functions using the training data used to train the first machine learning model;
    generating, by the classification model, a first confidence as to whether the invoice is to be paid based on the features of the operational data for the invoice;
    predicting, by the regression model, a first time corresponding to the desired confidence as to when the invoice is likely to be paid based on the features of the operational data for the invoice; and
    indicating, to a user, whether the invoice is to be paid based on the first confidence and the first time when the invoice is likely to be paid based on the desired confidence.

2. The method of claim 1, further comprising:
    determining, by the regression model, a plurality of times associated with a plurality of confidences of when the invoice is likely to be paid, wherein the plurality of times includes the first time and the plurality of confidences includes the desired confidence; and
    selecting the first time to be indicated to the user based on the desired confidence in relation to the other confidences in the plurality of confidences.

3. The method of claim 2, further comprising:
    obtaining an indication from the user of the desired confidence for a selected time when the invoice is likely to be paid;
    comparing the desired confidence to the plurality of confidences; and

19 selecting the first time from the plurality of times based on the comparison.

4. The method of claim 2, wherein for each time of the plurality of times:
the time is determined based on a different quantile corresponding to the confidence associated with the time, wherein the regression model is a quantile based regression model.

5. The method of claim 4, wherein:
the regression model includes a plurality of gradient boosted trees, wherein each gradient boosted tree is associated with a unique quantile; and
each time of the plurality of times is determined by a gradient boosted tree associated with the quantile corresponding to the confidence associated with the time.

6. The method of claim 1, wherein the classification model includes a binary classification model associated with a receiver operating characteristic (ROC) loss function, the first confidence being based on the ROC loss function.

7. The method of claim 1, further comprising:
periodically determining:
a new confidence as to whether the invoice is to be paid; and
a new first time that the invoice is to be paid that corresponds to the second confidence; and
indicating the new confidence and the new first time to the user.

8. The method of claim 1, wherein the first time is a predicted calendar day.

9. A system of indicating a forecast for an invoice payment to a user, comprising:
one or more processors; and
a memory coupled to the one or more processors and storing instructions that, when executed by the one or more processors, cause the system to perform operations comprising:
providing features of an operational data for an invoice to a classification model and to a regression model, wherein:
the classification model is a first machine learning model trained to solve a binary classification problem of whether the invoice is to be paid;
the first machine learning model is associated with a first loss function and is trained based on the first loss function using a training data associated with one or more previous invoices;
the regression model is a second machine learning model trained to predict a time as to when the invoice is likely to be paid based on a desired confidence; and
the second machine learning model is associated with one or more loss functions separate from the first loss function and is trained based on the one or more loss functions using the training data used to train the first machine learning model;
generating, by the classification model, a first confidence as to whether the invoice is to be paid based on the features of the operational data for the invoice;
predicting, by the regression model, a first time corresponding to the desired confidence as to when the invoice is likely to be paid based on the features of the operational data for the invoice; and
indicating, to a user, whether the invoice is to be paid based on the first confidence and the first time when the invoice is likely to be paid based on the desired confidence.

20

10. The system of claim 9, wherein execution of the instructions causes the system to perform operations further comprising:
determining, by the regression model, a plurality of times associated with a plurality of confidences of when the invoice is likely to be paid, wherein the plurality of times includes the first time and the plurality of confidences includes the desired confidence; and
selecting the first time to be indicated to the user based on the desired confidence in relation to the other confidences in the plurality of confidences.

11. The system of claim 10, wherein execution of the instructions causes the system to perform operations further comprising:
obtaining an indication from the user of the desired confidence for a selected time when the invoice is likely to be paid;
comparing the desired confidence to the plurality of confidences; and
selecting the first time from the plurality of times based on the comparison.

12. The system of claim 10, wherein for each time of the plurality of times:
the time is determined based on a quantile corresponding to the confidence associated with the time, wherein the regression model is a quantile based regression model.

13. The system of claim 12, wherein:
the regression model includes a plurality of gradient boosted trees, wherein each gradient boosted tree is associated with a unique quantile; and
each time of the plurality of times is determined by a gradient boosted tree associated with the quantile corresponding to the confidence associated with the time.

14. The system of claim 9, wherein the classification model includes a binary classification model associated with a receiver operating characteristic (ROC) loss function, the first confidence being based on the ROC loss function.

15. The system of claim 9, wherein execution of the instructions causes the system to perform operations further comprising:
periodically determining:
a new confidence as to whether the invoice is to be paid; and
a new first time that the invoice is to be paid that corresponds to the second confidence; and
indicating the new confidence and the new first time to the user.

16. The system of claim 9, wherein the first time is a predicted calendar day.

17. A system of indicating a forecast for an invoice payment to a user, comprising:
one or more processors; and
a memory coupled to the one or more processors and storing instructions that, when executed by the one or more processors, cause the system to perform operations comprising:
providing features of an operational data for an invoice to a classification model and to a regression model, wherein:
the classification model is a first machine learning model trained to solve a binary classification problem of whether the invoice is to be paid;
the first machine learning model is associated with a first loss function and is trained based on the first loss function using a training data associated with one or more previous invoices;

the regression model is a second machine learning model trained to predict a time as to when the invoice is likely to be paid based on a desired confidence; and the second machine learning model is associated with one or more loss functions separate from the first loss function and is trained based on the one or more loss functions using the training data used to train the first machine learning model;

obtaining an indication from a user of the desired confidence for the time to be selected as to when the invoice is likely to be paid;

generating, by the classification model, a first confidence as to whether an invoice is to be paid based on the features of the operational data for the invoice;

predicting, by the regression model, a first time as to when the invoice is likely to be paid based on the desired confidence and based on the features of the operational data for the invoice;

indicating, to the user, whether the invoice is to be paid based on the first confidence and the first time when the invoice is likely to be paid.

18. The system of claim 17, wherein:

the regression model includes a plurality of gradient boosted trees, wherein each gradient boosted tree is associated with a unique quantile; and the first time is determined by a gradient boosted tree from the plurality of gradient boosted trees, wherein the gradient boosted tree is associated with the quantile corresponding to the desired confidence.

19. The system of claim 18, wherein execution of the instructions causes the system to perform operations further comprising:

determining a plurality of times by the plurality of gradient boosted trees; and indicating, to the user, the plurality of times when the invoice is likely to be paid and the quantiles associated with the plurality of times, wherein the first time is included in the one or more times.

20. The system of claim 18, wherein the classification model includes a binary classification model associated with a receiver operating characteristic (ROC) loss function, the first confidence being based on the ROC loss function.

* * * * *